United States Patent
McCormick

(10) Patent No.: US 11,542,085 B2
(45) Date of Patent: Jan. 3, 2023

(54) SHOCK ABSORBING CONTAINER TO PROTECT CRYOPRESERVED BIOLOGICAL MATERIAL

(71) Applicant: BioLife Solutions, Inc., Bothell, WA (US)

(72) Inventor: Bruce McCormick, Santa Fe, NM (US)

(73) Assignee: BIOLIFE SOLUTIONS, INC., Bothell, WA (US)

( * ) Notice: Subject to any disclaimer, the term of this patent is extended or adjusted under 35 U.S.C. 154(b) by 267 days.

(21) Appl. No.: 16/843,514

(22) Filed: Apr. 8, 2020

(65) Prior Publication Data
US 2021/0316927 A1    Oct. 14, 2021

(51) Int. Cl.
| | | |
|---|---|---|
| B65D 85/00 | (2006.01) | |
| B65D 81/02 | (2006.01) | |
| A01N 1/02 | (2006.01) | |
| B65D 81/107 | (2006.01) | |

(52) U.S. Cl.
CPC ......... B65D 81/022 (2013.01); *A01N 1/0242* (2013.01); *B65D 81/107* (2013.01); *B65D 81/1075* (2013.01)

(58) Field of Classification Search
CPC .............. A01N 1/0242; B65D 81/113; B65D 81/1075; B65D 81/107; B65D 81/022; B65D 81/03; A45C 13/02
USPC .................................. 206/523, 592, 591, 586
See application file for complete search history.

(56) References Cited

U.S. PATENT DOCUMENTS

| | | | |
|---|---|---|---|
| 5,090,571 A | * | 2/1992 | Walker .................. A61B 50/30 220/23.9 |
| 5,626,814 A | | 5/1997 | Vicino |
| 6,209,343 B1 | | 4/2001 | Owen |
| 2007/0144936 A1 | * | 6/2007 | Stegner ................ B65D 81/113 206/521 |
| 2007/0289894 A1 | * | 12/2007 | Tennant ............. A61B 10/0096 206/569 |

(Continued)

FOREIGN PATENT DOCUMENTS

| | | |
|---|---|---|
| AT | 231090 | 2/2003 |
| CN | 202436012 U | 9/2012 |

(Continued)

OTHER PUBLICATIONS

International Search Report for PCT/US2021/02615 dated Jul. 28, 2021.

*Primary Examiner* — King M Chu
(74) *Attorney, Agent, or Firm* — Brown & Michaels, PC

(57) ABSTRACT

A shock absorbing container to protect cryogenically frozen biological material includes an outer case, which includes a first outer panel and a second outer panel, the first outer panel and the second outer panel movable relative to each other between a closed position and an open position, the first outer panel and the second outer panel defining a storage space in the closed position, the first outer panel having a first side facing the storage space, the second outer panel having a first side facing the storage space, wherein moving the first outer panel and the second outer panel into the open position creates or enlarges an opening to access the storage space. A first foam panel is on the first side of the first outer panel, and a second foam panel on the first side of the second outer panel.

21 Claims, 7 Drawing Sheets

(56) References Cited

U.S. PATENT DOCUMENTS

| | | | | |
|---|---|---|---|---|
| 2008/0210588 A1* | 9/2008 | Stegner | ................ | B65D 81/113 |
| | | | | 206/523 |
| 2009/0038901 A1* | 2/2009 | Pomerantz | ............. | A45C 13/02 |
| | | | | 206/523 |
| 2010/0294675 A1* | 11/2010 | Mangano | ................ | A45C 11/04 |
| | | | | 206/5 |
| 2015/0068232 A1 | 3/2015 | Petrov | | |
| 2018/0055042 A1 | 3/2018 | Ortiz | | |

FOREIGN PATENT DOCUMENTS

| | | | | |
|---|---|---|---|---|
| CN | 201320076367 U | 8/2013 | | |
| EP | 3243383 | 11/2017 | | |
| JP | 2017506097 A | 3/2017 | | |
| WO | 2013053011 A1 | 4/2013 | | |
| WO | WO-2013053011 A * | 4/2013 | ........... | A01N 1/0236 |

* cited by examiner

SHOCK ABSORBING CONTAINER TO PROTECT CRYOPRESERVED BIOLOGICAL MATERIAL

BACKGROUND OF THE INVENTION

Field of the Invention

The invention pertains to the field of storage and transport of biological material, and more particularly, to a shock absorbing device to protect cryopreserved biological material.

Description of Related Art

Most or all biologic-based materials, including medicines, vaccines, cell and gene therapies, and engineered tissue products, are subject to hypothermic storage of varying duration to attempt to ensure survival, recovery during an ex vivo storage interval, and return to normal biologic function following an ex vivo storage interval. Current methods deploy various insulated shipping containers and biopreservation media of varying formulas. One method of storing and transporting blood or other biological fluid, for example, includes containing the fluid in deformable thermoplastic bags, which are then placed within a hard, typically metal, cassette. The cassettes provide an ability to organize and store the plastic bags in cryogenic freezers, as well as to provide protection for the bags. Typically the cassettes are sized to hold the plastic bags with minimal excess space to spread the biological fluid uniformly and facilitate a uniform rate of freezing and/or thawing.

Freezing some materials to cryogenic temperatures (e.g. temperatures to as low as −196 degrees Celsius or colder), including storage container material and biological material, can make the material brittle and susceptible to damage from shock normally encountered during transport. Thermoplastic bags containing biological fluid, as discussed in the example above, when frozen, can become brittle. A plurality of the frozen cassettes discussed above, containing the thermoplastic bags of biological fluid, can be secured within a dry vapor shipper to maintain the cryogenic temperature during shipping. Shock and vibration experienced by the dry vapor shipper can be transmitted to the plurality of cassettes and the plastic bags within, causing one or more of the plastic bags to fracture, resulting in a catastrophic loss of biological fluid. In the case of cell and gene therapy products, the lost fluid might have been a life-saving material made for a single patient at a very high monetary cost.

SUMMARY OF THE INVENTION

A shock absorbing container protects cryogenically frozen biological material by absorbing, dampening, or attenuating physical forces that would otherwise cause cryogenic storage and/or shipping materials to be damaged, as well as the biological material contained therein.

In an embodiment, a shock absorbing container to protect cryogenically frozen biological material includes: an outer case, which includes a first outer panel and a second outer panel, the first outer panel and the second outer panel movable relative to each other between a closed position and an open position, the first outer panel and the second outer panel being approximately parallel to each other and defining a storage space in the closed position, the first outer panel having a first side facing the storage space, the second outer panel having a first side facing the storage space, wherein moving the first outer panel and the second outer panel into the open position creates or enlarges an opening to access the storage space; a first foam panel on the first side of the first outer panel; and a second foam panel on the first side of the second outer panel.

In another embodiment, a shock absorbing container for storing or transporting a frozen bag of biological fluid includes: an outer case defining an internal volume and having a closable opening to insert to, or remove from, the internal volume a bag of biological fluid, the outer case having an open position and a closed position, the outer case having a length, a width, and a thickness in the closed position, the length and the width greater than the thickness, the closable opening configured to open a greater amount than the thickness; and a foam dampener on at least two opposing peripheral sides of the internal volume.

DETAILED DESCRIPTION OF THE INVENTION

Figure 1:
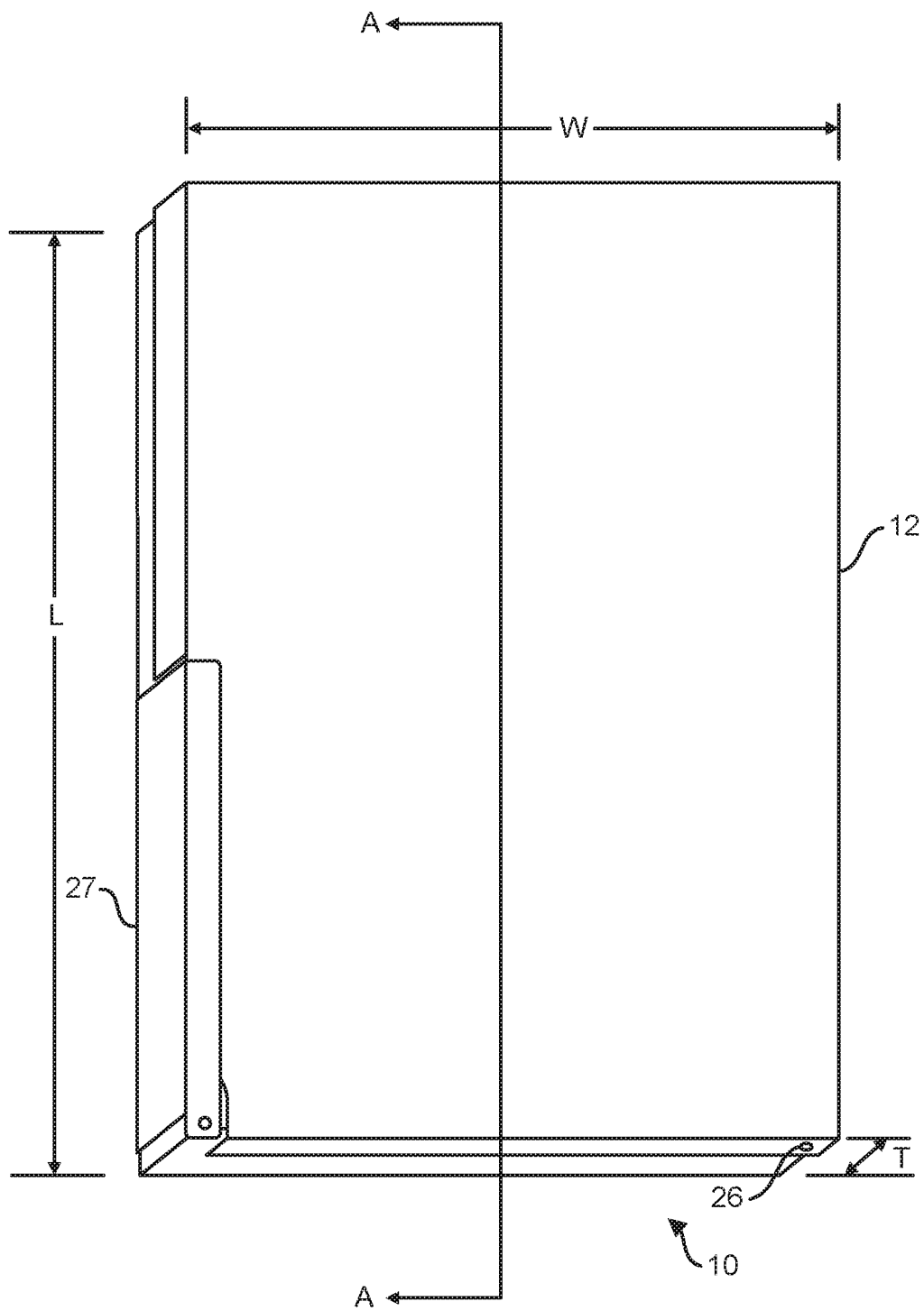
FIG. 1 illustrates an isometric view of a shock absorbing container, in a closed position, according to an embodiment.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The term "elastic deformation" is understood to be a reversible change in the dimensions of a material, in which the material has a first set of dimensions when no forces are applied to it, the material transitions to a second set of dimensions when forces are applied to it, and the material transitions back to its original set of dimensions when the forces are no longer applied. Such deformation includes but is not limited to changes in spatial dimensions and combinations thereof (e.g., changes in volume, cross-sectional profile, and diameter), and can result from forces including, but not limited to, forces of compression and/or stretching under tension.

Figure 2:
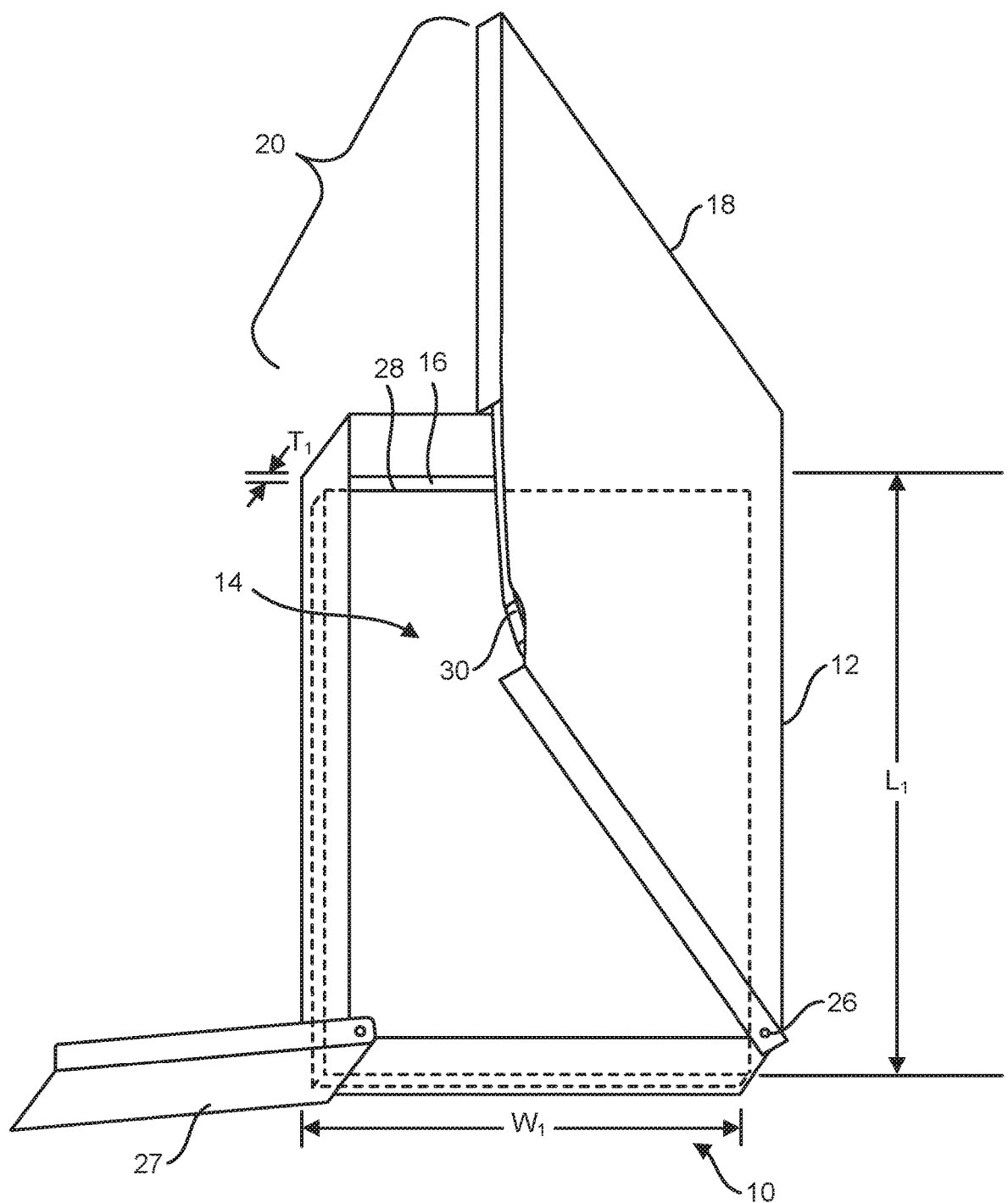
FIG. 2 illustrates an isometric view of the shock absorbing container of FIG. 1, in an open position.
Figure 3:
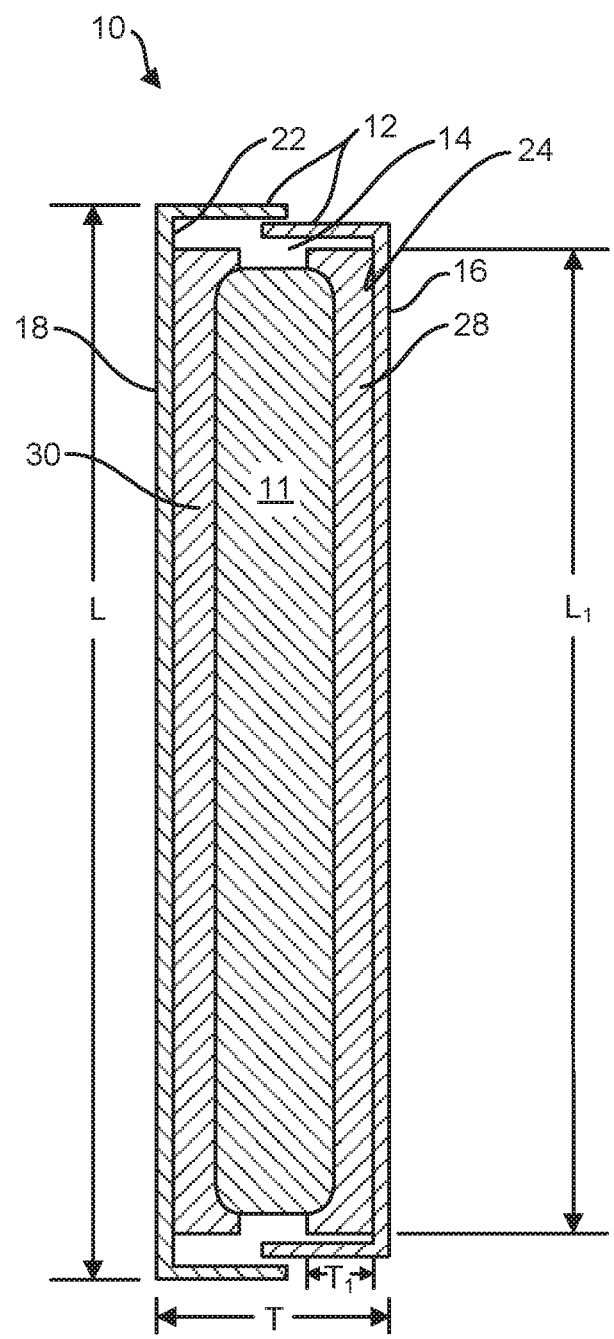
FIG. 3 illustrates a cross-sectional view of the shock absorbing container of FIG. 1, additionally containing a bag of biological fluid.

As discussed above, a shock absorbing container protects cryogenically frozen biological material by absorbing, dampening, or attenuating physical forces that would otherwise cause cryogenic storage and/or shipping materials to be damaged, as well as the biological material container therein. FIG. 1 illustrates an isometric view of a shock absorbing container 10, in a closed position, according to an embodiment. FIG. 2 illustrates an isometric view of the shock absorbing container 10 in an open position. FIG. 3 illustrates a cross-sectional view of the shock absorbing container 10, additionally containing a bag of biological fluid 11. With reference to FIG. 1, FIG. 2, and FIG. 3, the shock absorbing container 10 includes an outer case 12, which defines an internal volume 14 or storage space to store biological material. For example, the bag of biological fluid 11 (see FIG. 3) can be placed to occupy the internal volume 14 when the shock absorbing container 10 is in the open position, and then contained and protected in the internal volume 14 when the shock absorbing container 10 is in the closed position. The outer case 12 can be rigid, hard, and durable, such as would be many metals or plastics.

The outer case 12 can be shaped variously to accommodate containment of various biological materials or biological material containers. The depicted embodiment is shaped like a three-dimensional parallelepiped, with a length L, a width W, and a thickness T, in the closed position. In the depicted embodiment, the length L and the width W are greater than the thickness T. The respective values for the length L, the width W, and the thickness T can vary depending on the biological material and/or the biological material container to be contained within the internal volume 14.

The outer case 12 can include a first panel 16 and a second panel 18, which can be approximately parallel in the closed position, and/or can each include a respective inner side 22, 24 facing the internal volume 14. "Approximately parallel" can mean plus or minus any number of degrees from parallel within ten degrees, such as plus or minus 0.1 degrees, plus or minus 1 degree, plus or minus 2 degrees, plus or minus 2.5 degrees, plus or minus 5 degrees, etc. The first panel 16 and the second panel 18 can be movable relative to each other between the closed position and the open position in order to create an opening 20. The relative movement of the first panel 16 and the second panel 18 can be achieved by pivot joint 26 where the first panel 16 is pivotably connected to the second panel 18, or by other now-known or future-developed means. In some embodiments, e,g, the first panel 16 can be entirely separated from the second panel 18. The first panel 16 and the second panel 18 can be moved to enlarge the opening 20, as necessary, such that the biological material, or a biological material container (not shown) can be placed into and removed from the internal volume 14. In some embodiments, the opening 20 is configured to open at least an amount greater than the thickness T. In the case of a bag of biological fluid, it would be beneficial for the opening 20 to open large enough to place the bag in flat.

The outer case 12 can include a securing element, such as fastener 27 pivotably attached to the first panel 16. The fastener 27 can pivot into a fastening position to retain the first panel 16 and the second panel 18 in the closed position, and into an unfastening position to allow the first panel 16 and the second panel 18 to be moved into the open position. Other now-known or future-developed fastening or locking means can be utilized as well.

Figure 4:
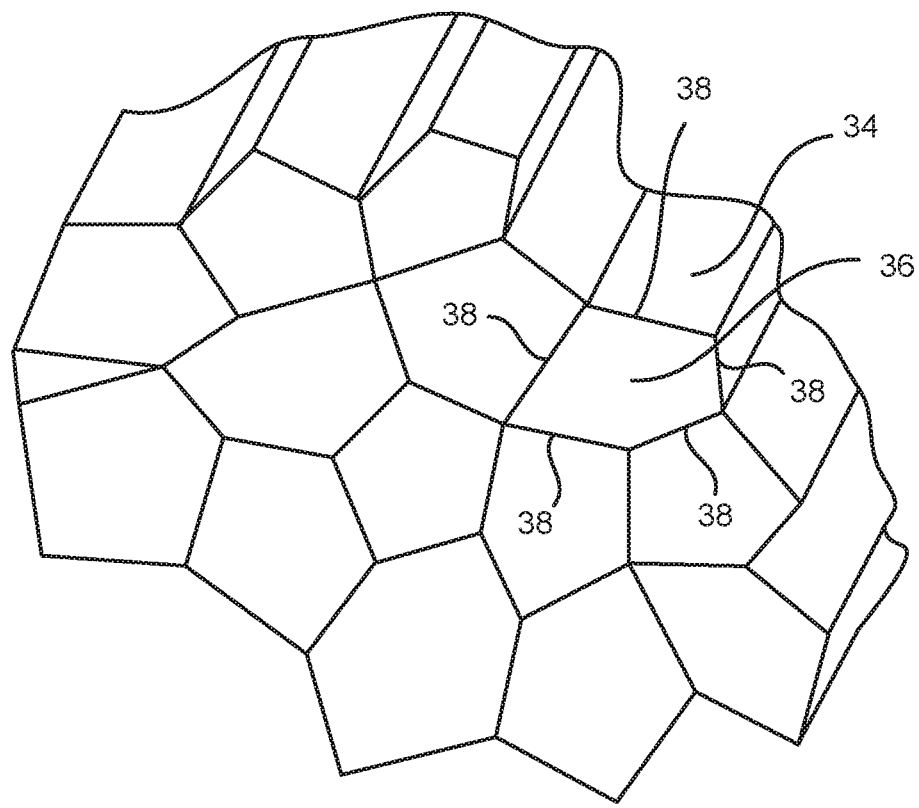
FIG. 4 illustrates a single layer of a structure of a foam material.
Figure 5:
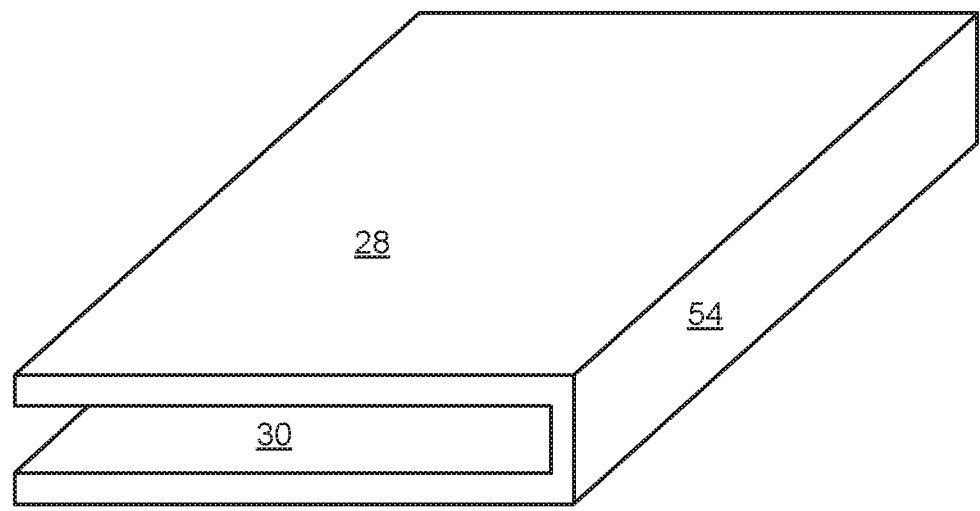
FIG. 5 illustrates foam panels, according to an embodiment.
Figure 6:
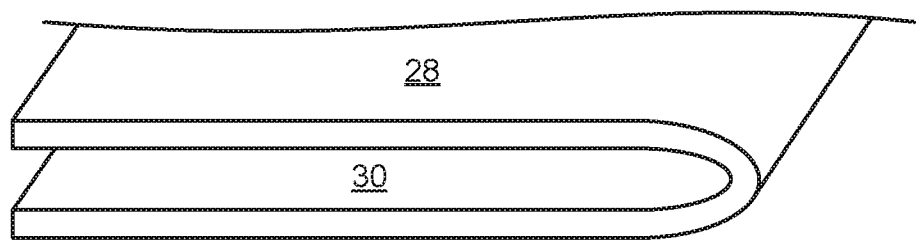
FIG. 6 illustrates foam panels, according to an embodiment.
Figure 7:
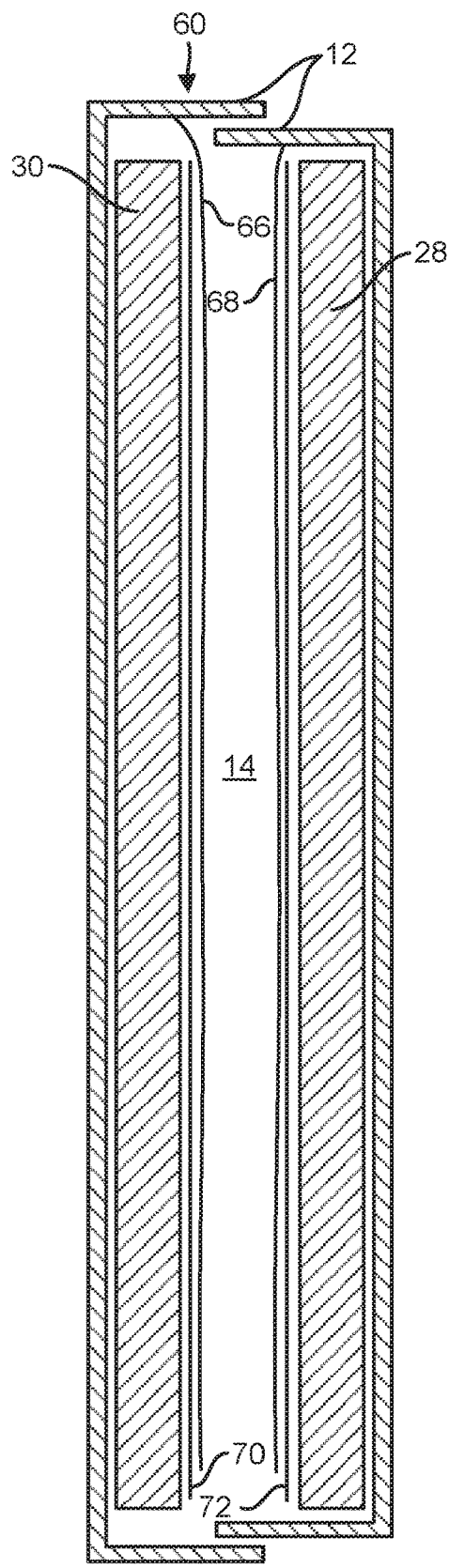
FIG. 7 illustrates a cross-sectional view of a shock absorbing container, according to an embodiment.
Figure 8:
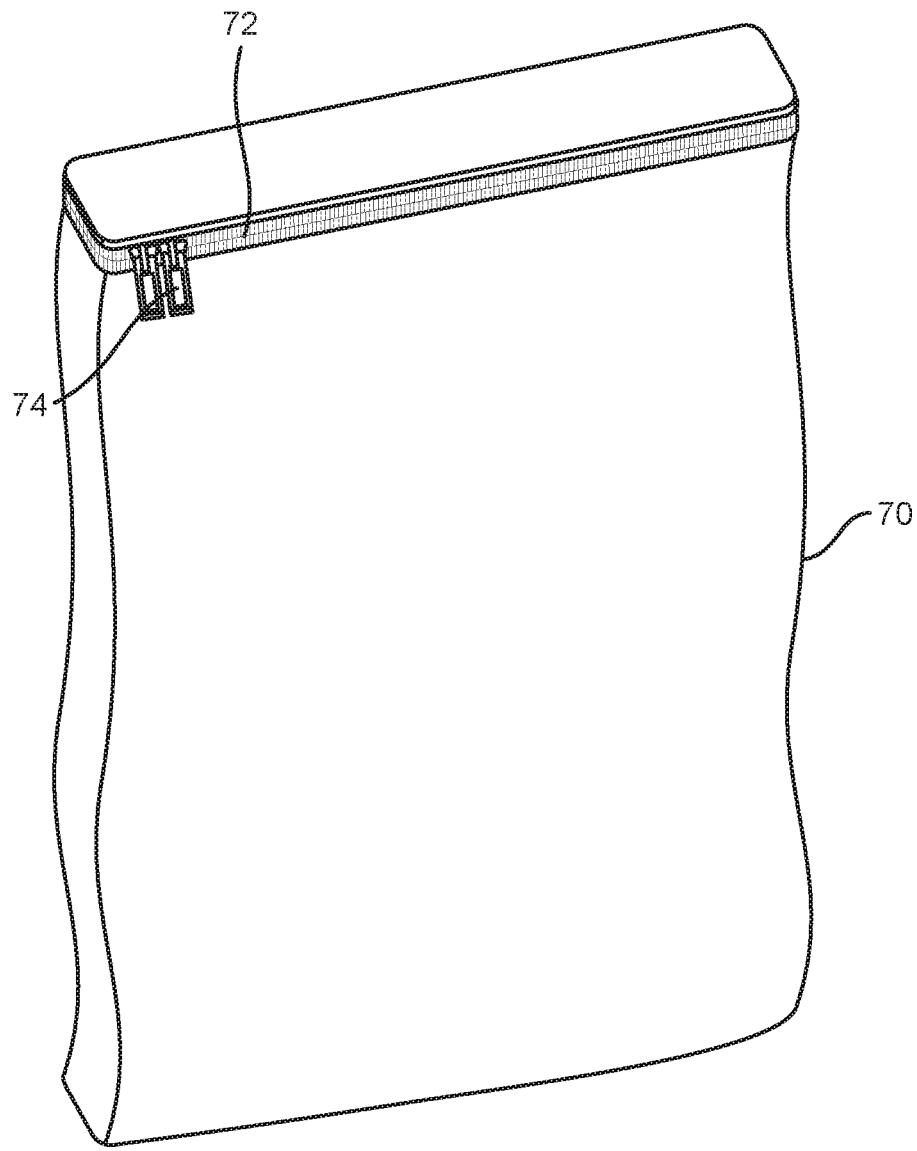
FIG. 8 illustrates an inner liner with a sealable opening.

The shock absorbing container 10 also includes a first foam panel 28 on the inner side 22 of the first panel 16, and a second foam panel 30 on the inner side 24 of the second panel 18. As explained further herein below, the first foam panel 28 and the second foam panel 30 are dampeners, or shock absorbers, to absorb, dissipate, or attenuate physical force applied to the shock absorbing container 10 that otherwise would be transmitted to the biological material container (not shown) and/or biological material contained therein. FIG. 4 illustrates a single layer of the structure of a foam material 32, which can be used to make the first foam panel 28 and the second foam panel 30. As shown in FIG. 4, the foam of the first foam panel 28 and the second foam panel 30 can have bubbles or cells 34 with polyhedra cell windows or faces 36 divided by lineal boundaries or edges 38. Density of the foam can be measured in pores per inch ("PPI"). In an embodiment, the first foam panel 28 and the second foam panel 30 have density in the range of 10-40 PPI (approximately 3.94-15.75 pores per centimeter).

In some embodiments, the foam of the first foam panel 28 and the second foam panel 30 can be or can include a reticulated foam. Reticulated foam is a very porous, low density solid foam. Reticulated foams have few, if any, intact cells (bubbles) 34 or polyhedra cell windows (faces) 36. In a reticulated foam only the lineal boundaries (edges) 38 where the cell windows 36 meet remain, and the polyhedra cell windows 36 are missing. The solid component of a reticulated foam may be an organic polymer like polyurethane, a ceramic, or a metal.

When at ambient temperatures, the foam panels 28, 30 can be flexible and deformable, in which case the foam panels 28, 30 can conform around a cryogenically frozen biological material or a cryogenically frozen container of biological material (such as the bag of biological fluid 11 in FIG. 3). During use of the shock absorbing container 10, the cryogenically frozen biological material and/or the container of cryogenically frozen biological material is quickly placed through the opening 20 of the outer case 12 and into the internal volume 14. The foam panels 28, 30, being unfrozen or at ambient temperature, can deform to the shape of the biological material container (such as bag of biological fluid 11 in FIG. 3), and can quickly become rigid as the foam panels 28, 30 quickly cryogenically freeze. When the temperature of the foam panels 28, 30 drops below a certain temperature, such as 0 degrees Celsius, the material becomes rigid. The rigid material has increased brittleness—more so with the net-like, low density structure of reticulated foam. In the frozen, brittle state, the foam panels 28, 30 endure small fractures in the bubble faces 36, or in the case of reticulated foam, bubble edges 38, during shocks or vibrations. These fractures absorb or dampen the shock or vibration forces, thereby attenuating or eliminating transmission of the forces to the biological material container in the internal volume 14 and/or the biological material therein. Generally, faces 36 of non-reticulated foam can withstand a greater force before breaking than mere edges 38 of reticulated foam. Accordingly, reticulated foam can provide shock absorption of lower forces, and non-reticulated foam can provide shock absorption of higher forces.

Referring to FIG. 2 and FIG. 3, the foam panels 28, 30, being on opposing sides of the internal volume 14, can be sized with a width $W_1$ and length Li greater than a width and length of the biological material container (e.g., the bag of biological fluid 11 in FIG. 3) to provide impact protection and absorption on all sides of the biological material container, though the foam panels 28, 30 could also have a shorter width $W_1$ and/or length Li than the biological material container. Further, the foam panels 28, 30, being constrained in ability to expand or move outward by the outer case 12, can be sized with a thickness $T_1$ to press inwardly against the biological material container with enough force to reduce or prevent movement of the biological material container with respect to the foam panels. Furthermore, in the case that the width $W_1$ and/or length Li of the foam panels 28, 30 are greater than the width or length of the biological material container or biological material contained in the internal volume 14, as shown in FIG. 3, then as a result of compression by the foam panels 28, 30 on the biological material container or biological material, the biological material container or biological material presses into the thickness $T_1$ of the foam panel, such that any excess width $W_1$ or length Li not depressed holds the biological material container or biological material from sliding out of the internal cavity 14 in a plane defined by the length Li and the width $W_1$.

In the case that biological fluid is contained in the internal volume 14, such as is depicted in FIG. 3, the compression by the foam panels 28, 30 facilitates uniform thickness of the biological fluid, which further facilitates uniform thawing of the biological fluid during a thawing process.

The thickness $T_1$ of the foam panels 28, 30 can be a predetermined value as desired in order to maintain standard or uniform dimensions of the outer case 12, while having the capability of storing variously sized biological material containers or biological materials within the internal cavity 14. In other words, the size of the outer case 12 can be standardized, and the foam panels 28, 30 can be varied in size ((primarily in thickness $T_1$) to accommodate variously sized biological material containers or biological materials within the internal cavity 14.

FIG. 5 illustrates an embodiment of foam panels in which a first foam panel 28 is connected to a second foam panel 30 by a third foam panel 54. The first foam panel 28 and/or the second foam panel 30 can also be directly connected, as shown in FIG. 6. In the embodiment of the outer case 12 shown in FIGS. 1 and 2, the third foam panel 54, and/or the connection of the first foam panel 28 and the second foam panel 28 is intended to be positioned adjacent the joint 26.

Additionally, the shock absorbing container 10 can include an inner liner and/or a liquid-absorbing liner. FIG. 7 illustrates a cross-section of a shock absorbing container 60 that includes an outer case 12 and foam panels 28, 30, as in FIGS. 1-3, and that additionally includes a first inner liner 66, a second inner liner 68, a first liquid-absorbing liner 70, and a second liquid-absorbing liner 72. The inner liners 66, 68 are in the internal cavity 14, and are each configured to hold a respective one of the foam panels 28, 30 in place with respect to the outer case 12. In the embodiment shown, the inner liners 66, 68 each form a pocket or pouch integrated with, or fastened to the outer case 12, and enclosing a respective one of the foam panels 28, 30. In some embodiments, each inner liner 66, 68 does not attach to the outer case 12, and instead wraps around four sides of the respective foam panel 28, 30, extending between the respective foam panel 28, 30 and the respective inner surface 22, 24 of the foam panel 28, 30. In some embodiments, the inner liners 66, 68 entirely enclose a respective one of the foam panels 28, 30, while in other embodiments, the inner liners 66, 68 each enclose an amount of a respective one of the foam panels 28, 30 to merely retain the respective foam panel 28, 30 in position with respect to the outer case 12. The inner liners 66, 68 can also hold broken edges of the foam panels 28, 30, to collect the broken edges and reduce or prevent foam debris from covering the biological material container (e.g., bag of biological fluid shown in FIG. 3). A more open inner liner 66, 68 can facilitate removal and replacement of the foam panels 28, 30, to facilitate reuse of the shock absorbing container 60. A more enclosing inner liner 66, 68 can facilitate better collection and retention of the broken debris. In some embodiments, each inner liner 66, 68 can entirely enclose a respective one of the foam panels 28, 30. In some of these embodiments, the inner liners 66, 68 can each include a sealable or re-sealable opening to allow complete enclosure of the foam panels 28, 30 while also allowing removal and replacement of the foam panels 28, 30. FIG. 8 illustrates an inner liner 70 with a sealable opening 72, which in this embodiment is opened and closed with a zipper 74, though any now-known or future developed opening and closing mechanism can be utilized. The inner liner 70 can entirely enclose either one of the foam panels 28, 30.

The liquid-absorbing liners 70, 72 in FIG. 7 are positioned adjacent an inner surface of a respective one of the foam panels 28, 30, between the respective foam panel 28, 30 and a respective one of the inner liners 66, 68. As such, the liquid-absorbing liners 70, 72 are held in place by a respective one of the inner liner 66, along with the foam panels 28, 30. The liquid-absorbing liners 70, 72 can be any material suitable to absorb and hold liquids. The liquid-absorbing liners 70, 72 are included, in some embodiments, at least in part, to meet regulatory requirements for shipment of infectious substances or exempt human specimens. In some embodiments, the liquid-absorbing liners 70, 72 are configured with sufficient volume and absorbing capacity to fully absorb the volume of liquid contained within the biological material container (e.g., bag of biological fluid shown in FIG. 3). The bag of biological fluid shown in FIG. 3 can contain, for example, 25 mL to 250 mL, though the biological material container can have any desired capacity, and the liquid-absorbing liners 70, 72, the foam panels 28, 30, the inner liners 66, 68, and the outer case 12 can all be sized accordingly. In some embodiments, one or more paper towels could suffice as the liquid-absorbing liners 70, 72. To allow liquid outside the pocket or pouch defined by the inner liner 66, 68 to reach liquid-absorbing liner 70, 72, the inner liner 66, 68 can be composed of a hydrophilic material with a porosity sufficient to allow liquids, such as liquid water or liquid nitrogen, to pass. A light-weight, non-woven polyester could be suitable, for example.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A shock absorbing container to protect cryogenically frozen biological material comprising:
an outer case including a first outer panel and a second outer panel, the first outer panel and the second outer panel movable relative to each other between a closed position and an open position, the first outer panel and the second outer panel defining a storage space in the closed position, the first outer panel having a first side facing the storage space, the second outer panel having a first side facing the storage space, wherein moving the first outer panel and the second outer panel into the open position creates or enlarges an opening to access the storage space;
a first foam panel on the first side of the first outer panel, the first foam panel including reticulated foam; and
a second foam panel on the first side of the second outer panel, the second foam panel including reticulated foam; the reticulated foam, at ambient temperature, can receive a bag of biological fluid, adapt to its shape accordingly, then be cryogenically frozen to become rigid relative to the first and second foam panels at ambient temperature.

2. The shock absorbing container of claim 1, wherein the outer case is metallic.

3. The shock absorbing container of claim 1, wherein the outer case is rigid relative to the first foam panel at ambient temperature.

4. The shock absorbing container of claim 1, wherein the first outer panel and the second outer panel are approximately parallel to each other in the closed position.

5. The shock absorbing container of claim 1, wherein the outer panel includes a pivot joint to pivot the first outer panel with respect to the second outer panel.

6. The shock absorbing container of claim 1, wherein the outer case, the first foam panel, and the second foam panel are configured and sized to uniformly compress a bag of biological fluid.

7. The shock absorbing container of claim 1, wherein the outer case includes a locking element to lock the first panel and the second panel in the closed position.

8. The shock absorbing container of claim 1, further comprising a pouch at least partially enclosing the first foam panel.

9. The shock absorbing container of claim 8, wherein the pouch is fastened to the first outer panel, and the first foam panel is between the pouch and the first outer panel.

10. The shock absorbing container of claim 8, wherein the pouch includes a hydrophilic material.

11. The shock absorbing container of claim 1, further comprising a liquid-absorbing liner adjacent the first foam panel.

12. The shock absorbing container of claim 1, further comprising a third foam panel connecting the first panel and the second panel.

13. The shock absorbing container of claim 1, wherein the outer case in the closed position is shaped like a three-dimensional parallelepiped and has a length, a width, and a thickness, wherein the first outer panel and the second outer panel are each positioned in a respective plane defined by the length and the width, and wherein the length and the width are greater than the thickness.

14. The shock absorbing container of claim 1, wherein the first foam panel is connected to the second foam panel.

15. A shock absorbing container for storing or transporting a frozen bag of biological fluid, comprising:
an outer case defining an internal volume and having a closable opening to insert to or remove from the internal volume the bag of biological fluid, the outer case having an open position and a closed position, the outer case having a length, a width, and a thickness in the closed position, the length and the width greater than the thickness, the closable opening configured to open a greater amount than the thickness;
a first foam dampener on a first peripheral side of the internal volume, the first foam dampener including reticulated foam; and
a second foam dampener on a second peripheral side of the internal volume, the second foam dampener including reticulated foam,
the first peripheral side and the second peripheral side being opposing peripheral sides of the internal volume;
the reticulated foam, at ambient temperature, can receive a bag of biological fluid, adapt to its shape accordingly, then be cryogenically frozen to become rigid relative to the first and second foam panels at ambient temperature.

16. The shock absorbing container of claim 15, wherein the first foam dampener has an internally facing surface facing into the internal volume, and the shock absorbing container further comprises a liner adjacent the internally facing surface.

17. The shock absorbing container of claim 16, wherein the liner includes a sealable opening for insertion or removal of the first foam dampener.

18. The shock absorbing container of claim 15, wherein the first foam dampener has an internally facing surface facing into the internal volume, and the shock absorbing container further comprises a liquid-absorption layer adjacent the internally facing surface.

19. A shock absorbing container to protect cryogenically frozen biological material comprising:
an outer case including a first outer panel and a second outer panel, the first outer panel and the second outer panel movable relative to each other between a closed position and an open position, the first outer panel and the second outer panel defining a storage space in the closed position, the first outer panel having a first side facing the storage space, the second outer panel having a first side facing the storage space, wherein moving the first outer panel and the second outer panel into the open position creates or enlarges an opening to access the storage space;

a first foam panel on the first side of the first outer panel;

a second foam panel on the first side of the second outer panel; and a pouch at least partially enclosing the first foam panel, the pouch being fastened to the first outer panel, and the first foam panel being between the pouch and the first outer panel.

20. A shock absorbing container to protect cryogenically frozen biological material comprising:

an outer case including a first outer panel and a second outer panel, the first outer panel and the second outer panel movable relative to each other between a closed position and an open position, the first outer panel and the second outer panel defining a storage space in the closed position, the first outer panel having a first side facing the storage space, the second outer panel having a first side facing the storage space, wherein moving the first outer panel and the second outer panel into the open position creates or enlarges an opening to access the storage space;

a first foam panel on the first side of the first outer panel;

a second foam panel on the first side of the second outer panel; and a pouch at least partially enclosing the first foam panel, the pouch including a hydrophilic material.

21. A shock absorbing container to protect cryogenically frozen biological material comprising:

an outer case including a first outer panel and a second outer panel, the first outer panel and the second outer panel movable relative to each other between a closed position and an open position, the first outer panel and the second outer panel defining a storage space in the closed position, the first outer panel having a first side facing the storage space, the second outer panel having a first side facing the storage space, wherein moving the first outer panel and the second outer panel into the open position creates or enlarges an opening to access the storage space;

a first foam panel on the first side of the first outer panel;

a second foam panel on the first side of the second outer panel; and a third foam panel connecting the first panel to the second panel.

* * * * *